Figure 1:
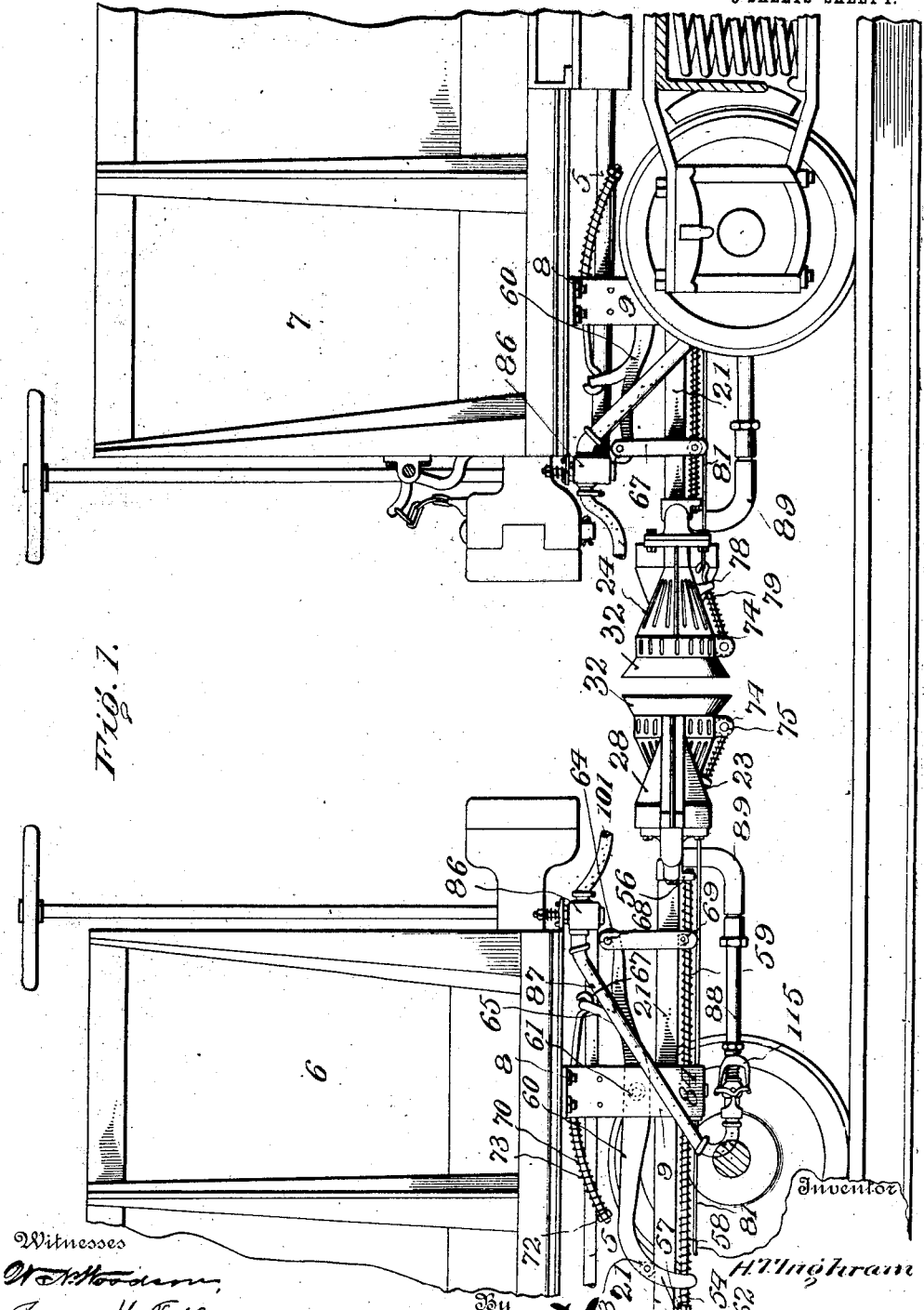

H. T. INGHRAM.
AIR BRAKE COUPLING.
APPLICATION FILED NOV. 24, 1909.

978,755.

Patented Dec. 13, 1910.

5 SHEETS—SHEET 1.

Witnesses
Inventor
H. T. Inghram
By
Attorneys.

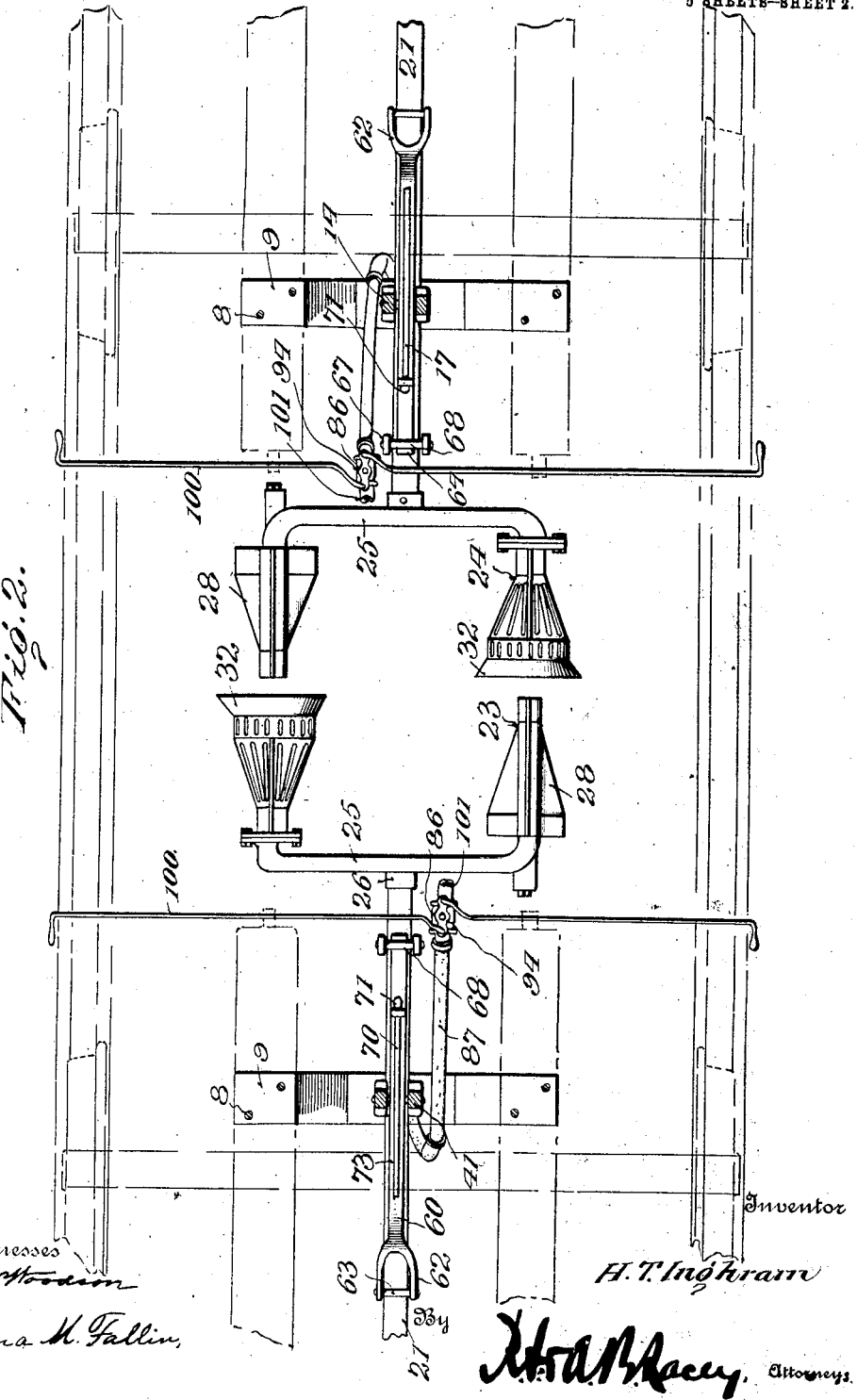

H. T. INGHRAM.
AIR BRAKE COUPLING.
APPLICATION FILED NOV. 24, 1909.
978,755.
Patented Dec. 13, 1910.
5 SHEETS—SHEET 3.
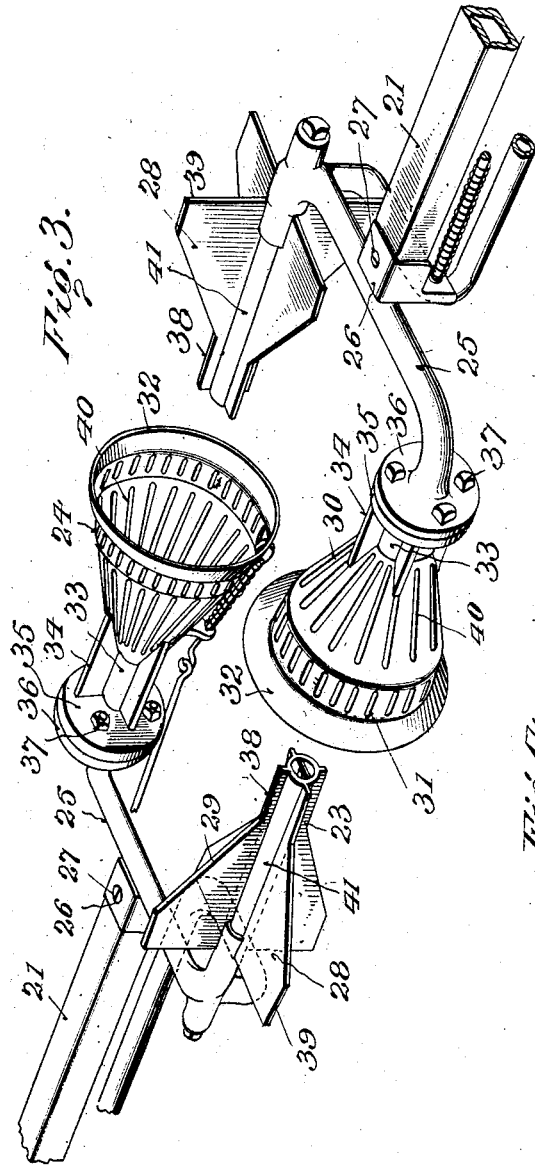
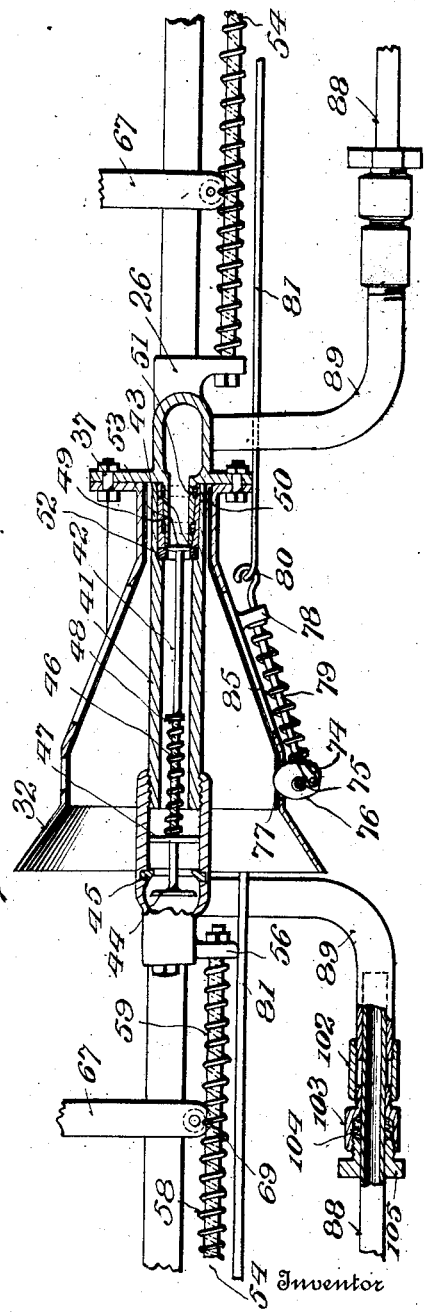
Witnesses
Inventor
H. T. Inghram
By
Attorneys

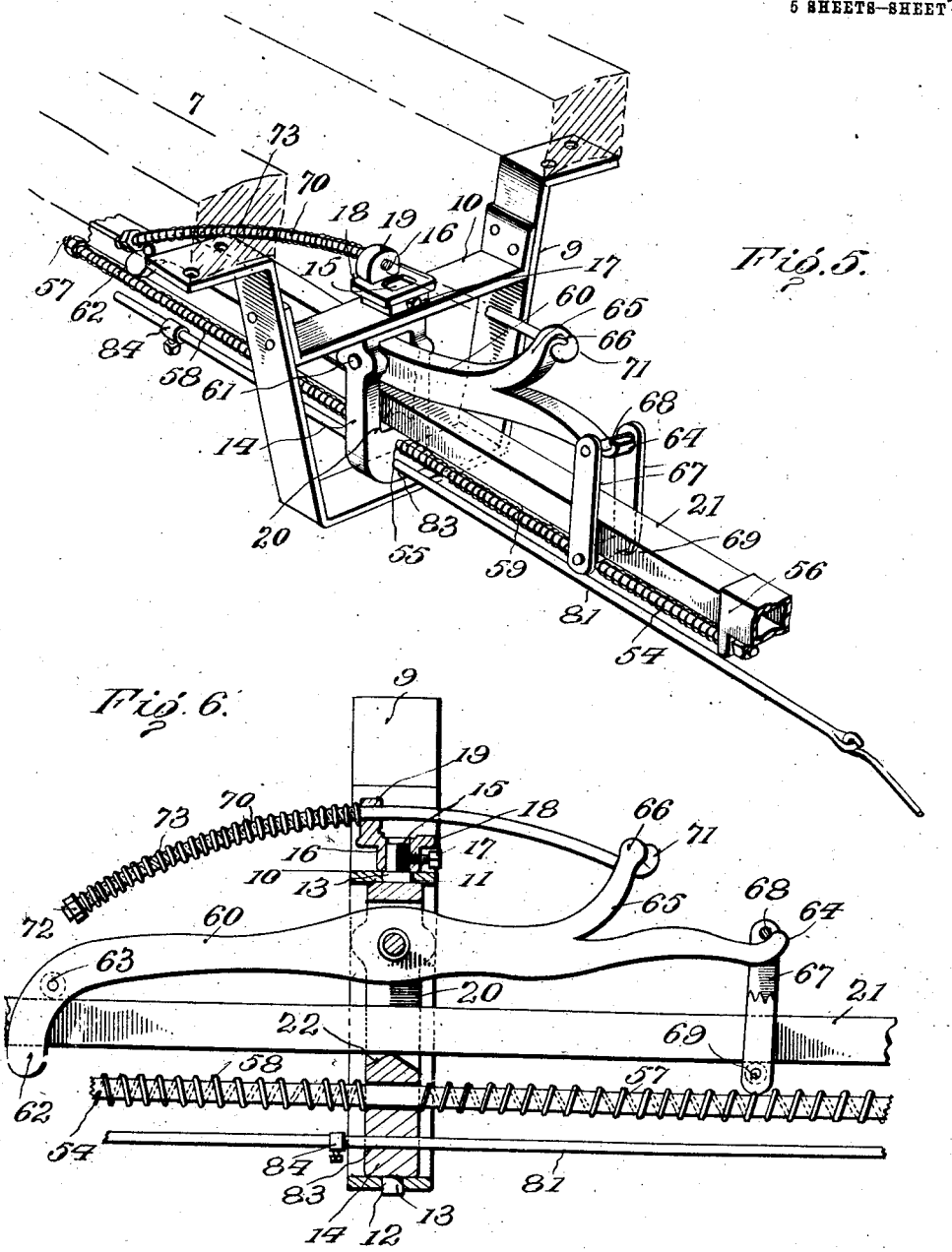

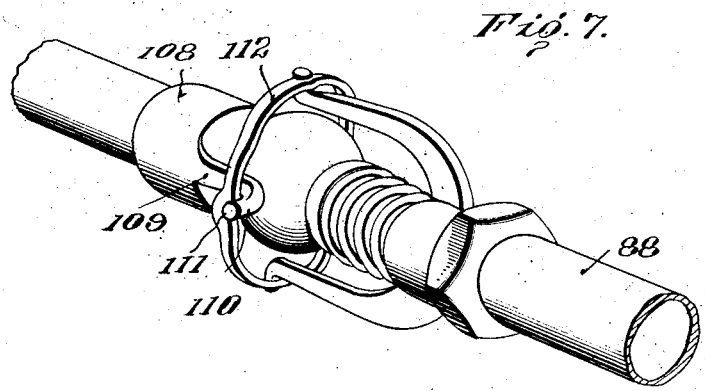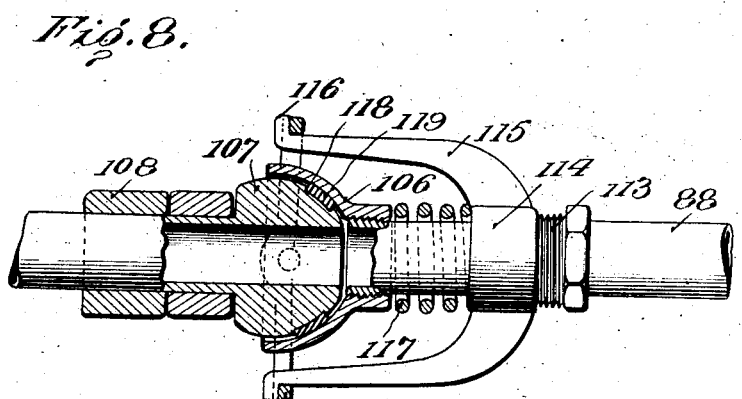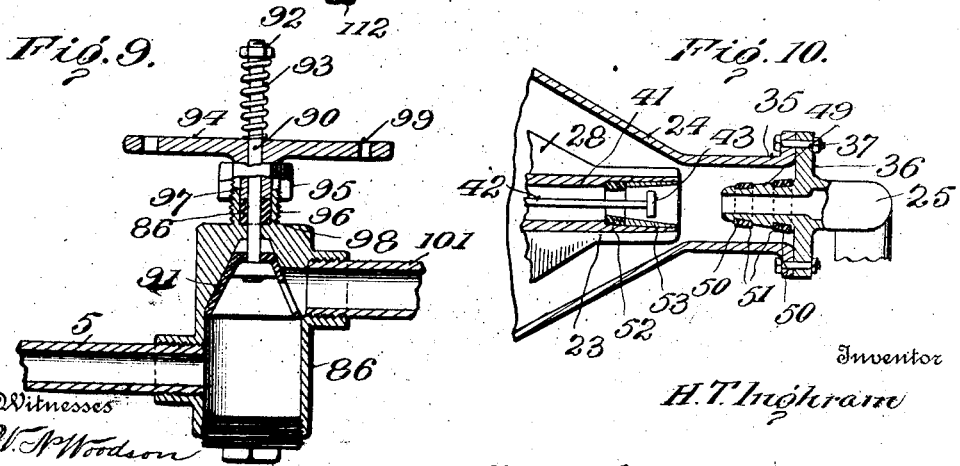

UNITED STATES PATENT OFFICE.

HOWARD T. INGHRAM, OF FAIRFIELD, IOWA.

AIR-BRAKE COUPLING.

978,755.   Specification of Letters Patent.   Patented Dec. 13, 1910.

Application filed November 24, 1909. Serial No. 529,785.

*To all whom it may concern:*

Be it known that I, HOWARD T. INGHRAM, citizen of the United States, residing at Fairfield, in the county of Jefferson and State of Iowa, have invented certain new and useful Improvements in Air-Brake Couplers, of which the following is a specification.

This invention relates to automatic air brake couplings and has for its object the provision of a strong, durable and thoroughly efficient device of this character, the construction of which is such that it may be instantly attached to a car without the employment of specially constructed draft rigging, and which will operate with equally good results either in connection with or independent of the present system of air couplings.

A further object is to provide a coupling which shall be positive and automatic in action, thus obviating the danger incident to going between the cars to effect the coupling and uncoupling of the hose.

A further object is to provide a coupling that will operate automatically on cars of different heights when traveling over all kinds of roads irrespective of atmospheric conditions.

A further object is to provide means for allowing a limited vertical and lateral movement of the coupling heads, and means for positively preventing detachment of said heads when making a curve or traveling over rough, uneven roads.

A still further object of the invention is generally to improve this class of devices, so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof and also to acquire a knowledge of the details of construction and the means for effecting the result, reference is to be had to the following description and accompanying drawings, in which:

Figure 1 is a side elevation of an automatic air brake coupling constructed in accordance with my invention; showing the cars in position to be coupled. Fig. 2 is a top plan view of the same, the cars being shown in dotted lines. Fig. 3 is a perspective view of the coupling members of adjacent cars detached and in position to be coupled. Fig. 4 is a longitudinal sectional view showing the position assumed by the parts when the heads are coupled. Fig. 5 is a perspective view partly in section, of one of the hangers and its associated parts. Fig. 6 is a vertical sectional view of Fig. 5. Fig. 7 is a perspective view of the universal pipe coupling connecting the branch pipe of the main valve within the adjacent coupling head. Fig. 8 is a longitudinal sectional view of Fig. 7. Fig. 9 is a vertical sectional view of the main valve. Fig. 10 is a detail longitudinal sectional view of the coupling heads showing the construction of the nipple on the female coupling member.

Corresponding and like parts are referred to in the following description and indicated in all the views of the drawings by the same reference characters.

The improved coupling forming the subject matter of the present invention may be used in connection with either passenger or freight cars, and by way of illustration is shown effecting the union of the train pipes 5 on adjacent freight cars, indicated at 6 and 7. Depending from the bottom of each car and rigidly secured thereto by bolts or similar fastening devices 8, is a hanger or bracket 9, the latter being preferably substantially U-shaped, as shown, and having its intermediate portion connected by a transverse brace 10 having a centrally disposed opening 11 formed therein which registers with a corresponding opening 12 formed in the lower portion of the hanger to permit the insertion of the reduced portions or trunnions 13 of an oscillating block or support 14. The upper trunnion 13 is provided with a square head 15 which engages a correspondingly shaped socket formed in a cap piece 16, the cap piece 16 being retained in position on the head 15 in any suitable manner, as for instance, by a clamping screw 17. The cap piece 16 is preferably reinforced and strengthened by the provision of an annular rib or flange 18, there being a guiding ear or lug 19 extending vertically on one side of the cap for the purpose hereinafter referred to.

The oscillating block or support 14 is provided with a vertically disposed slot 20 to permit the passage of a longitudinally disposed draw bar 21, the lower wall of the slot 20 being inclined or beveled in opposite directions at 22 to permit a slight vertical movement of the draw bar without binding or wedging in the slot 20.

Supported on the outer end of each draw bar 21 are correlated clamping members or heads 23 and 24, said heads being connected at their rear ends by a transverse pipe 25, to the intermediate portion of which is secured a rectangular socket 26 adapted to receive the outer end of the adjacent draw bar 21, said draw bar being rigidly secured to the socket 26 by screws or similar fastening devices 27. The male member 23 comprises a longitudinally disposed pipe section having a plurality of radiating wings or fins 28 preferably extending from one end of the pipe section to the other and having their intermediate portions inclined or beveled at 29 to conform to the shape of the conical portion 30 of the mating female member on an adjacent car. Each female member 24 is provided with an annular flange 31 and a flared mouth 32, which latter serves as a guide for the male member when the cars are coupled. Each female member 24 is also provided with a cylindrical portion 33 having a plurality of circumferential strengthening ribs 34 formed integral therewith and provided with a flange 35 which engages a similar flange 36 formed on the adjacent end of the transverse connecting pipe 25, the flanges 35 and 36 being rigidly united by transverse bolts 37. The wings 28 of the male member bear against the interior walls of the female member when the cars are coupled, with the relatively narrow portions 38 of the wings or fins 28 bearing against the interior walls of the cylindrical portion 33 of the female member, and with the flat faces 39 of said wings or fins bearing against the interior walls of the annular flange 31 of the female member, thus to effectually center the male member with respect to the female member and prevent accidental displacement of the coupling heads when traveling around curves or over rough, uneven roads. The conical portion 30 and annular flange 31 of each female member are preferably formed with a plurality of longitudinal slots 40 which serve to permit the escape of ice and snow in winter and thus allow the heads to couple regardless of atmospheric conditions.

Slidably mounted for longitudinal movement in the cylindrical body portion 41 of each male member, is a valve stem 42 having one end thereof provided with a cross bar or head 43, and its other end formed with a valve 44, which latter normally bears against a gasket or seat 45 in the cylindrical portion 41 and is retained in such position by a coil spring 46, thus to normally prevent the flow of air through the passage in the member 41 from one car to another. One end of the spring 46 bears against a partition 47 in the cylindrical member 41, while the other end thereof engages a transverse pin 48 carried by the stem 42, the tension of the spring being such as to cause the valve 44 to normally and yieldably engage the seat 45.

Extending inwardly from the flange 36 of the female member and spaced from the interior walls of the cylindrical portion 41 of said female member, is a nipple 49, the function of which is to engage the cross bar 43 and impart a longitudinal movement to the stem 42 to effect the opening of the valve 44 when the coupling heads are united so as to permit the flow of air from one car to another. The exterior walls of the nipple 49 are provided with spaced circumferential grooves 50, in which are seated suitable packing strips 51, the latter being adapted to bear against corresponding packing strips 52 and 53 carried by the interior walls of the cylindrical portion 41 of the mating male member.

Arranged beneath the draw bar 21 is a longitudinally disposed rod 54 having its intermediate portion extended through an opening 55 in the oscillating block or support 14, one end of the rod being rigidly secured to a bracket 56 depending from the draw bar 21 and the other end thereof provided with a nut 57. A coil spring 58 is interposed between one face of the oscillating support 14 and the nut 57 and a similar spring 59 interposed between the opposite face of the oscillating support 14 and the bracket 56, the function of said springs being to receive the impact of the heads when the cars are coupled and also to return the heads to normal position after the coupling heads have been released or detached.

Extending through the slot 20 in the oscillating block or support 14 and preferably disposed above the draw bar 21, is a rocking lever 60 having its intermediate portion pivotally mounted at 61 between the walls of said slot so as to allow rocking movement of the lever on the support. The rear end of the lever 60 is bifurcated to form spaced depending arms 62, which latter span the adjacent draw bar 21 and are connected by a roller 63 bearing against the upper longitudinal edge of the draw bar, as best shown in Fig. 6 of the drawings. The other end of each lever 60 terminates in an upwardly extending hook 64, while an arm 65 extends upwardly from said lever at a point between the pivot 61 and the hook 64, said arm terminating in an eye 66. Spaced strap irons 67 are disposed on opposite sides of the draw bar 21 and are connected at their opposite ends by rollers 68 and 69, one of which engages the hook 64, while the other roller bears against the lower longitudinal edge of the draw bar 21. Slidably mounted in the perforation of the guiding ear 19, is an arcuate bar or rod 70 having one end thereof extended through the eye 66 and provided with a terminal hook 71 and its opposite end provided with a nut or stop 72, there being a coil spring 73 interposed between the nut 72 and ear 19 and surrounding the arcuate rod 70, as shown. Thus it will be seen that the rollers 63 and 69, by engagement with the upper and lower longitudinal edges of the draw bar 21, serve to normally and yieldably retain the bar in a horizontal plane, while the inclined faces 22 of the oscillating support 14, serve to permit tilting movement of the draw bar 21 in a vertical plane to allow the coupling heads to engage the coupling heads of mating cars of different heights, the spring 73 serving to return the draw bar 21 to normal or horizontal position after each tilting movement of the latter. It will also be noted that by reason of the pivotal connection between the oscillating support 14 and hanger 9, the draw bar 21 and its associated parts are free to swing laterally in a horizontal plane when traveling around curves, thus permitting both lateral and vertical movement of the draw bar 21.

The springs 58 and 59 not only serve to return the coupling heads to normal position after the cars are detached, but also serve to normally and yieldably hold the nipple 49 in engagement with the packing on the male member, thus to effectually prevent leakage between the parts when the cars are coupled.

As a means for automatically locking the male member in engagement with the female member, there is provided a latch, preferably in the form of a cam 74, which latter is pivotally mounted at 75 between spaced ears 76 on the female member and projects through an opening 77 in said female member for engagement with the adjacent reinforcing wing or fin 28 on the male member.
Slidably mounted in a block or keeper 78 on the female member, is a short rod section 79 having one end thereof operatively connected with the cam 74 and its other end projected through the keeper 78 and provided with an eye 80 for engagement with a relatively long rod section 81, the latter being extended through an opening 83 in the oscillating block or support 14 and provided with an adjustable collar or stop 84. A compression spring 85 is coiled around the short rod section 79 for the purpose of moving the locking member or cam 74 into engagement with the wing or fin on the male member. The stop 84 normally bears against one side of the oscillating member 14 and serves to hold the locking member or cam 74 in inoperative position. When the cars are coupled however, the impact of the coupling heads will force the latter, together with the draw bar 21, longitudinally of the car and in doing so move the stop 84 out of engagement with the oscillating member 14 so as to cause the spring 85 to force the cam 74 into frictional engagement with the adjacent wing or fin on the male member.
When the cars are uncoupled, the spring 59 will automatically return the draw bar 21 and coupling heads to their outermost position and at the same time move the locking rod 81 longitudinally, thus causing the stop 84 to engage the adjacent face of the oscillating member 14 and effect the release of the locking member or cam 74, as will be readily understood.

Connected in the train pipe 5 of each car, is a main valve 86 to which is connected a conductor preferably formed in three sections 87, 88 and 89 and through which air under pressure flows from the train pipe of one car through the male member of one coupling head and thence through the female member of the adjacent coupling head to the train pipe of the next succeeding car when said cars are coupled. Slidably mounted for vertical movement in the valve casing, is a stem 90 having a conical shaped valve 91 secured to its lower end and provided at its upper end with a nut 92, there being a coil spring 93 interposed between the nut 92 and a cross arm 94 carried by the stem, as best shown in Fig. 9 of the drawings. A clamping nut 95 is threaded on an extension 96 of the valve casing and is provided with a central annular flange 97 which operates in a recess in said valve casing and serves to compress the packing 98 therein and thus effectually prevent leakage of the valve. The opposite ends of the arm 94 are provided with openings 99 which receive suitable operating rods 100, the latter being extended to the opposite sides of the car so that the operator may rotate the main valve to control the flow of air from the train pipe of one car to the train pipe of another car without the necessity of going between the cars. A pipe or conductor 101 communicates with the interior of the valve casing and may be provided at its outer end with an air coupling of the usual construction so that the present device may be used on cars in which the ordinary system of air couplers are employed.

The main valve 86 is so arranged that by turning the member 91 in one direction, the flow of air from the train pipe of one car through the coupling head of said car to an adjacent car, may be cut off and said air permitted to flow through the conductor 101 when the latter conductor is provided with the usual coupling head, and when the valve is rotated in the other direction the port communicating with the conductor 101 will be shut and the air in the train pipe on one car directed through the coupling head on an adjacent car, thus permitting the device to be used in connection with or independent of the present system of air couplings, as before stated.

In order to permit a slight longitudinal movement of the pipe section 88 when the cars are coupled and uncoupled, the latter is slidably mounted within the pipe section 89, there being a sleeve 102 threaded on the pipe section 89 and engaging the threaded end of a cup or gland 103, the packing 104 in said gland being pressed laterally into engagement with the pipe section 88 to prevent leakage of air when rotating the cap piece 105, as best shown in Fig. 4 of the drawings. One end of the pipe 88 telescopes the pipe 89, while the other end thereof is provided with a semi-spherical socket piece 106, which latter receives the semi-spherical head 107 of the adjacent pipe section 87. A collar 108 is loosely mounted on the pipe section 87 and is provided with a plurality of laterally extending arms 109, the terminals of which are bent to produce fingers 110 seated in recesses 111 formed in the adjacent face of a connecting ring 112.

A threaded sleeve 113 is loosely mounted for sliding movement on the pipe section 88 and is provided with a collar 114 having a plurality of arms 115, similar in construction to the arms 109, the terminals of the arms 115 being provided with laterally extending fingers 116 which enter recesses in the opposite side of the ring 112. A coil spring 117 is interposed between the collar 114 and the socket member 106 for the purpose of normally and yieldably holding the socket member in contact with the head 107, the tension of the spring 117 being adjusted by rotating the threaded sleeve 113, as best shown in Fig. 8 of the drawings.

The head 107 is provided with an annular recess 118, in which is seated a packing 119, which latter bears against the interior wall of the socket member 106 and serves to effectually prevent leakage, while at the same time permitting the pipe sections 87, 88 and 89 to move in any direction regardless of the position assumed by the cars when being coupled or traveling around curves or over rough, uneven roads.

Attention is here called to the fact that the valve 44 is so constructed that in the event of breakage or leakage of the train pipe on one car after the cars are coupled, the air from the train pipe on the other car directed by the pipe section 89 directly on the head of the valve 44, will maintain the valve in open position and thus permit the air to escape to effect the application of the brakes, the spring 46 serving to return the valve 44 to closed position after the brakes have been applied.

The operation of the device is as follows: When the cars are brought together, the male member on one car enters the female member on the adjacent car and presses the draw bar 21, longitudinally against the tension of the springs 59, thus permitting the springs 85 to force the locking members or cams 74 into engagement with the wings or fins on the female member to lock the male and female members against accidental displacement. When the coupling heads are brought together, the nipple 49 on one head will actuate the cross bar 43 on the valve stem of an adjacent head to open the valve and permit the passage of air from the train pipe of one car to the train pipe of another car. When the cars are uncoupled, the springs 59 will automatically return the draw bars 21 to normal position and in doing so cause the stops 84 to engage the oscillating supports 14 and release the locking member 74, the levers 60 and springs 73 serving to permit lateral, longitudinal and vertical movement of the draw bars and their associated parts during the coupling and uncoupling operation.

From the foregoing description it is thought that the construction and operation of the device will be understood by those skilled in the art and further description thereof is deemed unnecessary.

Having thus described the invention, what is claimed as new is:

1. The combination with a car, of a hanger suspended from the car, a support mounted for oscillation in the hanger, a draw bar carried by the support and provided with correlated coupling heads, and a lever pivotally mounted on the support and having means for engagement with the upper and lower longitudinal edges of the draw bar.

2. The combination with a car, of a hanger suspended from the car, an oscillating support pivotally mounted in the hanger and having a slot formed therein, one wall of which is inclined or beveled in opposite directions, a draw bar extending through the slot in the support, correlated coupling heads carried by the draw bar, a lever pivotally mounted on the support and having one end thereof bearing against the upper longitudinal edge of the draw bar, and links pivotally mounted with the other end of the lever and provided with a roller bearing against the lower longitudinal edge of the draw bar.

3. The combination with a car, of a hanger suspended from the car, an oscillating support pivotally mounted in the hanger, a draw bar extending through the support, correlated coupling heads carried by the draw bar, a lever operatively connected with the upper and lower longitudinal edges of the draw bar, and a spring operatively connected with one end of the lever for maintaining the latter in normal position.

4. The combination with a car, of a hanger suspended from the car, an oscillating support pivotally mounted in the hanger, a draw bar extending through the support, correlated coupling heads carried by the draw bar, a lever pivotally mounted on the support and having means for engagement with the upper and lower longitudinal edges of the draw bar, a rod connected with one end of the lever, and a coil spring surrounding the rod.

5. The combination with a car, of a hanger suspended from the car, an oscillating support pivotally mounted in the hanger and provided with a vertically disposed slot, a draw bar extending through said slot, correlated coupling heads carried by the draw bar, a lever pivotally mounted in the slot of the support above the draw bar and having means for engagement with the upper and lower longitudinal edges of said draw bar, a rod carried by the draw bar and provided with oppositely disposed stops, and springs surrounding the rod and interposed between the opposite faces of the support and the adjacent stops.

6. The combination with a car, of a hanger suspended from the car, an oscillating support pivotally mounted in the hanger and having a vertical slot formed therein, a draw bar extending through said slot, correlated coupling heads carried by the draw bar, a lever pivotally mounted in the slot of the support above the draw bar and having one end thereof bifurcated, a roller carried by the bifurcated end of the lever and bearing against the upper longitudinal edge of the draw bar, links suspended from the other end of the lever and connected by a roller bearing against the lower longitudinal edge of the draw bar, an arcuate rod connected with the lever, and a coil spring surrounding the arcuate rod.

7. The combination with a car, of a hanger suspended from the car, an oscillating support pivotally mounted in the hanger and having a vertically disposed slot, a draw bar slidably mounted in said slot, correlated coupling heads carried by the draw bar, means for normally and yieldably retaining the draw bar in extended position, a lever having one end thereof provided with a roller bearing against the upper longitudinal edge of the draw bar, links suspended from the other end of the lever and provided with a roller bearing against the lower longitudinal edge of the draw bar, a spring operatively connected with the lever for normally retaining the draw bar in horizontal position, and means extending through the support for clamping the coupling heads on one car in engagement with the coupling heads on an adjacent car.

8. The combination with a car, of a hanger suspended from the car, an oscillating support pivotally mounted in the hanger and provided with a vertical slot, a longitudinally movable draw bar extending through the slot, correlated coupling heads carried by the draw bar, a lever pivotally mounted in the slot above the draw bar and having one end thereof bifurcated and its other end formed with a hook, a roller journaled on the bifurcated end of the lever and bearing against the upper longitudinal edge of the draw bar, links suspended from the hooked end of the lever and connected by a roller bearing against the lower longitudinal edge of the draw bar, an arm extending from the upper edge of the lever and provided with an eye, a rod connected with the eye, and a spring carried by the rod.

9. The combination with a car, of a hanger suspended from the car, an oscillating support pivotally mounted in the hanger and having a square head, a draw bar slidably mounted in the support, correlated coupling heads carried by the draw bar, a lever pivotally mounted on the oscillating support above the draw bar, one end of said lever being adapted to bear against the upper longitudinal edge of the draw bar and the other end thereof being operatively connected with the lower longitudinal edge of the draw bar, a cap engaging the angular head of the support and provided with a perforated ear, an arm extending laterally from the lever and provided with an eye, an arcuate rod having one end thereof connected with the eye and its other end provided with a stop nut, and a coil spring carried by the rod and interposed between the nut and perforated eye of the cap.

10. The combination with a car, of a hanger suspended from the car, an oscillating support pivotally mounted in the hanger and having a vertical slot formed therein, a draw bar slidably mounted in said slot, correlated coupling heads carried by the draw bar, a lever pivotally mounted in the slot above the draw bar and having its opposite ends operatively connected with said draw bar, a spring operatively connected with one end of the lever, a rod extending through the oscillating support and having its opposite ends provided with stops, coil springs surrounding the rod and bearing against the opposite faces of the oscillating support and the adjacent stops, a locking member pivotally mounted on one of the coupling heads, a rod operatively connected with the locking member and extending through the oscillating support, and a stop carried by the free end of the locking rod.

11. The combination with a car, of a hanger suspended from the car, an oscillating support pivotally mounted in the hanger, a draw bar mounted for longitudinal movement through said hanger, a lever pivotally mounted on the oscillating support and having its intermediate portion provided with an arm terminating in an eye, one end of the lever being provided with a hook, the opposite end of the lever being bifurcated and adapted to span the longitudinal bar, a roller journaled on the bifurcated end of the lever and bearing against the upper longitudinal edge of the draw bar, links suspended from the hooked end of the lever, a roller connecting the links and bearing against the lower longitudinal edge of the draw bar, a cap carried by the oscillating support and provided with a perforated ear, a rod having one end thereof engaging the eye on the arm of the lever and its other end extended through the ear and provided with a nut, and a spring interposed between the perforated ear and said nut.

12. The combination with a car, of a hanger suspended from the car and provided with an opening, a transverse bar secured to the hanger and provided with a corresponding opening, a support having reduced portions journaled in the openings in the hanger and bar respectively, one of said reduced portions being provided with an angular head, there being a slot formed in the central portion of the support, a longitudinal draw bar extending through the slot of the support, correlated coupling heads carried by the longitudinal bar, a cap engaging the square head of the support and provided with an upstanding perforated ear, a lever pivotally mounted in the slot of the support above the longitudinal bar and having its opposite ends operatively connected with the opposite longitudinal edges of the draw bar, an arcuate rod having one end thereof provided with a stop nut and its intermediate portion extended through the perforated eye in the cap for engagement with the intermediate portion of the lever, a coil spring surrounding the rod and bearing against said stop nut, and means for normally and yieldably retaining the draw bar in extended position.

13. The combination with a car, of a hanger suspended from the car, an oscillating support pivotally mounted in the hanger and having a vertically disposed slot formed therein, the lower wall of which is inclined or beveled in opposite directions, a draw bar slidably mounted in the slot of the support and bearing against the apex of the inclined walls of said slot, correlated coupling heads carried by the draw bar, a lever pivotally mounted in the slot of the support above the draw bar and having one end thereof bifurcated and its other end provided with a hook, a roller connecting the bifurcated portion of the lever and bearing against the upper longitudinal edge of the draw bar, links suspended from the hook and connected by a roller bearing against the lower longitudinal edge of the draw bar, an arm projecting upwardly from the lever between its pivot and hooked end and provided with an eye, a cap piece carried by the oscillating support and provided with a perforated ear, an arcuate rod having one end thereof provided with a nut and its other end engaging the ear, a coil spring interposed between the perforated ear and nut, means for normally and yieldably retaining the draw bar in extended position, a locking rod extending through the support, and a locking member pivotally mounted on one of the coupling heads and adapted to engage the coupling head on an adjacent car, when said cars are coupled.

14. The combination with a car including a train pipe and valve, of a hanger suspended from the car, an oscillating support pivotally mounted in the hanger, a draw bar slidably mounted for longitudinal movement in the support and having a vertical movement independent of the support, correlated coupling heads carried by the draw bar, means mounted on the oscillating support and engaging the upper and lower longitudinal edges of the draw bar on opposite sides of said support, a conductor forming a connection between the valve and coupling heads, a valve carried by one of the coupling heads, and means carried by the other coupling head and adapted to engage and open the valve in the coupling head of an adjacent car when said cars are coupled.

15. The combination with a car including a train pipe and valve, of a hanger suspended from the car, a support yieldably mounted in the hanger, a draw bar slidably mounted for longitudinal movement in the support, a lever pivotally mounted on the support and engaging the upper and lower longitudinal edges of the draw bar on opposite sides of said support, correlated coupling heads carried by the draw bar, a conductor forming a connection between the valve and coupling heads, a cam pivotally mounted on one of said coupling heads and adapted to engage the coupling head on an adjacent car when said cars are coupled, means for moving the cam to operative position when the cars are coupled, and means for releasing the cam when the cars are uncoupled.

16. The combination with a car including a train pipe and valve, of a longitudinal draw bar suspended from the car, correlated coupling heads carried by the draw bar, a conductor forming a connection between the valve and coupling heads, a lever secured to the valve stem, and rods operatively connected with the opposite ends of the lever and extended to the adjacent sides of the car for operating said valve manually.

17. The combination with a car including a train pipe and valve, of a bracket suspended from the car, a draw bar mounted for longitudinal, lateral and vertical movement in the bracket, correlated coupling heads carried by the draw bar, a conductor forming a connection between the valve and coupling heads, means for normally and yieldably supporting the draw bar in extended position, and means for locking one of the coupling heads on one car in engagement with the mating coupling head on an adjacent car when said cars are coupled.

18. The combination with a car, of a draw bar suspended from the car, correlated coupling heads carried by the draw bar, one of which is provided with a conical body portion having an annular flange terminating in a laterally flared mouth, the mating coupling head being provided with correspondingly shaped radial fins extending the entire length of said mating head.

19. The combination with a car, of a draw bar suspended from the car, correlated coupling heads carried by the draw bar, one of which is provided with a longitudinally slotted conical body portion having an annular flange and provided with a laterally flared mouth, the mating coupling head being provided with a plurality of radiating strengthening fins extending the entire length of said mating head and adapted to engage the interior walls of a conical head when said heads are coupled.

20. The combination with a car, of a draw bar suspended from the car, correlated coupling heads carried by the draw bar, one of which is provided with a conical body portion having a flared mouth and provided with a reduced cylindrical portion having radiating strengthening fins secured thereto, the other coupling head being provided with correspondingly shaped radiating fins adapted to engage the interior walls of an adjacent coupling head.

21. The combination with a car, of a draw bar suspended from the car, correlated coupling heads carried by the draw bar, one of which is provided with a conical shaped body portion having a flared mouth and provided with a longitudinally extending nipple, the other member being provided with correspondingly shaped fins adapted to engage the interior walls of a mating conical coupling head, and a valve carried by the other coupling head and movable to open position by engagement with the nipple.

22. The combination with a car including a train pipe and valve, of a draw bar suspended from the car, correlated coupling heads carried by the draw bar, one of which is provided with a conical portion having a flared mouth, and the other provided with a plurality of radiating fins, a transverse pipe connecting the coupling heads, a conductor forming a connection between one of the coupling heads and the valve, an auxiliary valve carried by the male member, and a nipple carried by the female member and adapted to engage and open the valve.

In testimony whereof I affix my signature in presence of two witnesses.

HOWARD T. INGHRAM. [L. S.]

Witnesses:
GERTRUDE K. FOWLER,
E. F. SIMMONS.